United States Patent
Brooks et al.

(10) Patent No.: US 10,218,563 B2
(45) Date of Patent: *Feb. 26, 2019

(54) MONITORING CONNECTIONS FOR DATA COMMUNICATIONS

(71) Applicant: INTERNATIONAL BUSINESS MACHINES CORPORATION, Armonk, NY (US)

(72) Inventors: Michael D. Brooks, Hursley (GB); Alan Hollingshead, Hursley (GB); Julian C. Horn, Hursley (GB); Philip I. Wakelin, Winchester Hants (GB)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 98 days.

This patent is subject to a terminal disclaimer.

(21) Appl. No.: 15/294,842

(22) Filed: Oct. 17, 2016

(65) Prior Publication Data

US 2017/0295083 A1    Oct. 12, 2017

Related U.S. Application Data

(63) Continuation of application No. 15/092,648, filed on Apr. 7, 2016.

(51) Int. Cl.
*H04L 12/24* (2006.01)
*H04L 12/26* (2006.01)

(52) U.S. Cl.
CPC ........ *H04L 41/0686* (2013.01); *H04L 43/067* (2013.01); *H04L 43/0858* (2013.01); *H04L 43/0894* (2013.01); *H04L 43/16* (2013.01)

(58) Field of Classification Search
None
See application file for complete search history.

(56) References Cited

U.S. PATENT DOCUMENTS

| | | | |
|---|---|---|---|
| 2008/0089235 A1* | 4/2008 | Kotrla | H04L 41/0659 370/242 |
| 2010/0142366 A1* | 6/2010 | Bugenhagen | H04L 41/147 370/216 |

(Continued)

OTHER PUBLICATIONS

Brooks et al., Pending U.S. Appl. No. 15/294,857 entitled "Managing Connections for Data Communications Using Heartbeat Messaging," filed on Oct. 17, 2016.

(Continued)

*Primary Examiner* — Rebecca E Song
(74) *Attorney, Agent, or Firm* — Cantor Colburn LLP; Steven Chiu (57) ABSTRACT

A method for monitoring connections for communicating data is provided. The method includes monitoring communication of data from a device over a connection. A current connection performance parameter for the connection is determined based on the monitoring. The current connection performance parameter is compared with a predetermined threshold. If the current connection performance parameter is less than or equal to the predetermined threshold, the connection is determined to be degraded. An alert may be provided to a user if the connection is determined to be degraded and an alert condition is met.

9 Claims, 4 Drawing Sheets

(56) References Cited

U.S. PATENT DOCUMENTS

| | | | |
|---|---|---|---|
| 2013/0148494 A1* | 6/2013 | Abbas | H04L 47/746 370/225 |
| 2016/0028615 A1* | 1/2016 | Lee | H04L 47/122 370/237 |
| 2016/0261504 A1* | 9/2016 | Sung | H04W 24/08 |
| 2018/0034692 A1 | 2/2018 | Brooks et al. | |
| 2018/0034917 A1 | 2/2018 | Brooks et al. | |

OTHER PUBLICATIONS

Brooks et al.; Pending U.S. Appl. No. 15/092,648; entitled "Monitoring Connections for Data Communications", filed Apr. 7, 2016.

Brooks et al.; Pending U.S. Appl. No. 15/132,457; entitled "Managing Connections for Data Communications Using Heartbeat Messaging", filed Apr. 19, 2016.

List of IBM Patents or Patent Applications Treated As Related; (Appendix P), Filed Oct. 17, 2016; 2 pages.

Brooks, Michael D. et al., Pending U.S. Appl. No. 16/028,454, filed Jul. 6, 2018; Entitled: System and Method For Managing Connections for Data Communications.

List of IBM Patents or Patent Applictions Treated As Related; (Appendix P), Date filed Jul. 6, 2018; 2 pages.

List of IBM Patents or Patent Applictions Treated As Related; (Appendix P), Date filed Jun. 8, 2018; 2 pages.

* cited by examiner

MONITORING CONNECTIONS FOR DATA COMMUNICATIONS

DOMESTIC PRIORITY

This application is a continuation application of the legally related U.S. Ser. No. 15/092,648 filed Apr. 7, 2016, the contents of which are incorporated by reference herein in their entirety.

BACKGROUND

The present disclosure relates to data communications, and, more specifically, to data communications on at least one connection between a server device and one or more client devices in a computing system or network.

Connections for communicating data between devices in a computing system or network may carry large volumes of data traffic in order for the devices, and thus the system or network, to operate efficiently. The performance of a computing system or network is, therefore, dependent on its connections for the communication of data.

SUMMARY

According to an aspect of the present disclosure, a computer-implemented method is provided. The communication of data from a device over a connection is monitored. A current connection performance parameter for the connection is determined, based on the monitoring. The current connection performance parameter is compared with a predetermined threshold. If the current connection performance parameter is less than or equal to the predetermined threshold, the connection is determined to be degraded.

According to another aspect of the present disclosure, an apparatus is provided. The apparatus comprises a device for communicating data over at least one connection. The device comprises a connection manager configured to monitor the communication of data from the device over a connection. The connection manager is further configured to determine a current connection performance parameter for the connection, based on the monitoring. The connection manager is further configured to compare the current connection performance parameter with a predetermined threshold. The connection manager is configured to determine that the connection is degraded if the current connection performance parameter is less than or equal to the predetermined threshold.

According to a further aspect of the present disclosure, a computer program product is provided. The computer program product comprises a computer readable storage medium having program instructions embodied therewith. The program instructions are executable by a processor to cause the processor to: monitor the communication of data from the device over a connection; determine a current connection performance parameter for the connection, based on the monitoring; compare the current connection performance parameter with a predetermined threshold, and determine that the connection is degraded if the current connection performance parameter is less than or equal to the predetermined threshold.

BRIEF DESCRIPTION OF THE DRAWINGS

Example implementations of the present disclosure will be described below with reference to the following drawings, in which.

DETAILED DESCRIPTION

In computing systems and networks, multiple connections may be used for the communication of data between components and devices. A connection may be regarded as a path for the communication of data between two nodes in a system or network. Such connections may take the form of logical connections over physical wired or wireless links, and logical connections may be viewed at any of a number of different levels of the seven-layer OSI model (or equivalent). In the following description, the term "connection" is intended to encompass both logical connections, for example at the Session layer or Transport layer of the OSI model, and physical connections. As the skilled person will appreciate from the following description, the described connections may be "stateful" connections, whereby information about the connections is maintained.

Connections may carry large volumes of data traffic in order for the components or devices at the nodes, and thus the system or network, to operate efficiently. For example, an IP connection may carry requests from a device operating as a client to a device operating as a server. The server may process the requests and send responses to the client over the IP connection. In some applications, the server may receive and process large volumes of requests, and send large volumes of responses, over a single IP connection sequentially (i.e., by serial communication) or over multiple IP connections substantially concurrently (i.e., by parallel communication). For example, middleware components used in IP computer networks may receive, and respond to, large volumes of requests from individual client components over a single IP connection or multiple IP connections.

If a connection for communicating data becomes inactive (i.e., stops communicating data), data requests are held up in the client device and data responses are held up in the server device leading to bottlenecks within the system or network, and eventually a stall condition. Accordingly, some existing systems and networks use techniques for identifying when a connection has become inactive.

In addition, if a connection for communicating data becomes degraded, for example in quality or performance, data requests may also be held up in the client device and/or data responses may also be held up in the server device. For example, a degraded connection may communicate data intermittently and/or at reduced communication rates. In consequence, a degraded connection may lead to a reduced average data communication rate, which, in turn, also may lead to bottlenecks in the system or network, and eventually a stall condition. However, since existing techniques focus on whether a connection is inactive, they are unable to identify when a connection is still active but has become degraded.

Example implementations of the present disclosure include systems, methods and computer program products for identifying when a connection for data communications has become degraded.

Figure 1:
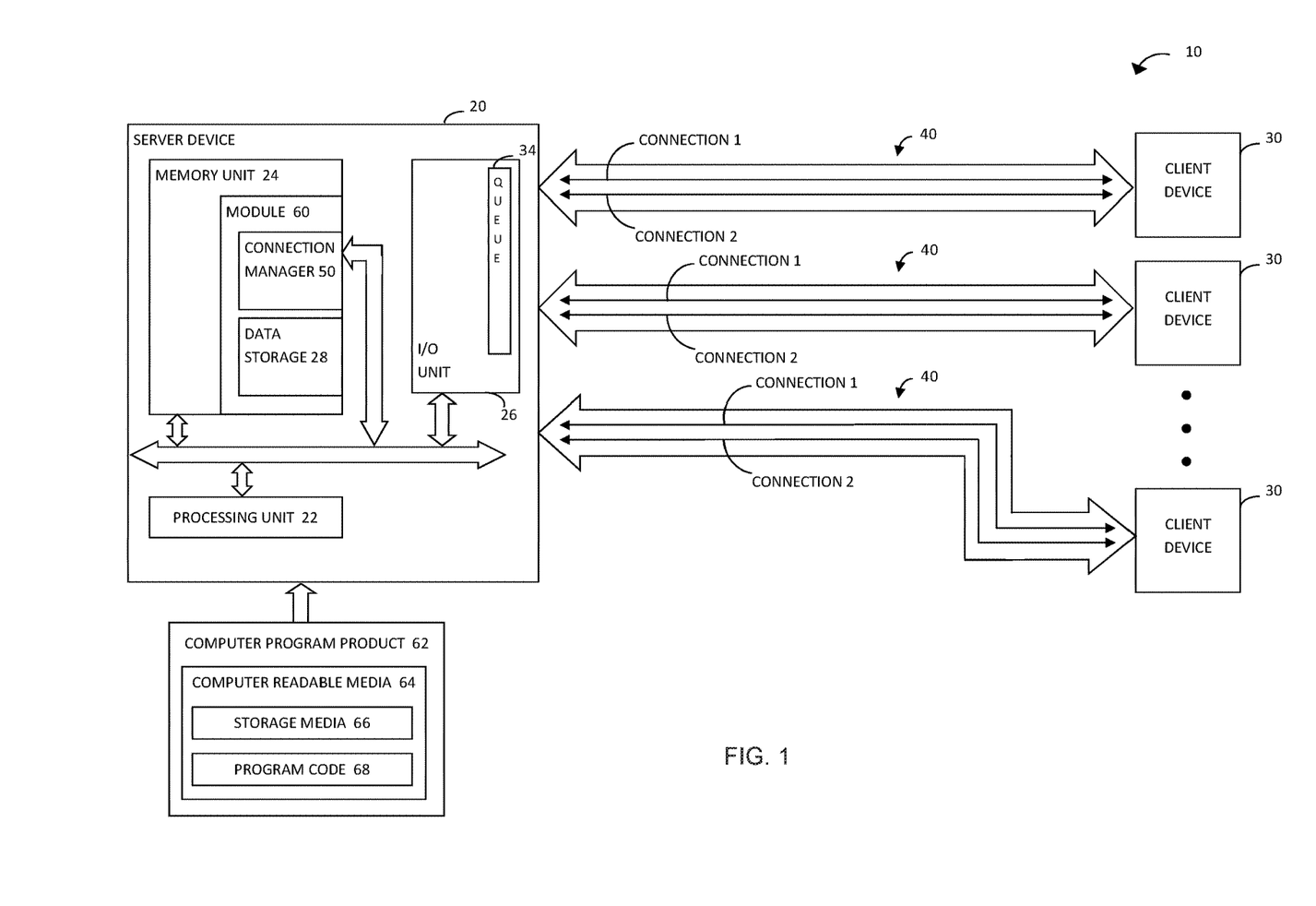
FIG. 1 is a block diagram of a computing system or network in accordance with an example implementation of the present disclosure.

FIG. 1 shows an example of a computer system or network in accordance with an example implementation of the present disclosure. The system 10 comprises a server device 20 and one or more client devices 30. As the skilled person will appreciate, the number of devices and their respective functions in the system 10 illustrated in FIG. 1 is by way of example only. In other example implementations, a system may include any number of server and client devices, and any individual device may perform the functions of a both a server and a client, according to the application.

Data is communicated between the server device 20 and each client device 30 over at least one connection 40. For simplicity, the illustrated system 10 includes just two connections 40, called "Connection 1" and "Connection 2", between the server device 20 and each client device 30, although any number of connections 40 are possible. Connections 40 may comprise established bidirectional communication paths between the server device 20 and a client device 30 over wired or wireless communication links. For example, in the context of a TCP/IP network, wired links may be provided by copper or optical fiber-based cables such as Ethernet, Digital Subscriber Line (DSL), Integrated Services Digital Network (ISDN), Fiber Distributed Data Interface (FDDI) or another type of network-compatible cable and wireless links may be established by any form of wireless technology such as Bluetooth™. Multiple connections 40 may be provided by multiple wired or wireless links or by multiple independent transmission sessions over one or more wired or wireless links. Similarly, in the context of a computing system, connections 40 may take the form of wired links such as conductive interconnect or any type of wired or wireless system bus.

A client device 30 may send a request as a data communication over a connection 40 (e.g., Connection 1), to the server device 20 and, in response to receiving and processing the request, the server device 20 may send a response as a data communication over the same connection 40 (i.e., Connection 1), to the client device 30.

Server device 20 includes a processing unit 22 for processing requests to produce responses, a memory unit 24 for storing data and an input/output (I/O) unit 26. The I/O unit 26 may be any suitable network interface for enabling communication of data over connections 40 to and from client devices 30. The I/O unit 26 comprises an output queue 34 for sending data responses as data communications over the connections 40 to the client devices 30. In example implementations, each response may comprise one or more network packets (e.g., TCP/IP packets in the case of an IP connection) of standard or predetermined form having inter alia a header containing control information and a payload containing data. The header includes source and destination addresses and packet length, indicative of the amount of data contained in the payload (e.g., in bytes). In other example implementations, each response may be in the form of a bit stream of data of arbitrary length (e.g., in bytes), which corresponds to the amount of memory (e.g., in bytes) occupied by the response, for example in the output queue 34. The server device 20 may output responses from the output queue 34 over the connections 40 as a serialized stream of data.

Server device 20 further includes a connection manager 50 in accordance with an example implementation of the present disclosure. The connection manager 50 monitors data communications to and from the I/O unit 26 over connections 40, and maintains data including data records for monitored data communications for each connection 40, in order to identify an active connection that has become degraded. In example implementations, the connection manager 50 may comprise a software module 60 including computer-executable instructions. The software module 60 may be installed on the server device 20 from a computer program product 62 comprising computer readable media 64 having storage media 66 and program instructions or code 68 embodied therewith. The software module 60 may be uploaded to the server device 20 and stored in memory unit 24. The computer-executable instructions of the software module 60 may be executed by processing unit 22 to perform a method in accordance with an example implementation of the present disclosure, for example by monitoring data communications for each connection 40, and storing corresponding records in data storage 28 in the memory unit 24. The skilled person will appreciate that the connection manager 50 may be implemented in any suitable form including software, firmware, and/or hardware.

Figure 2:
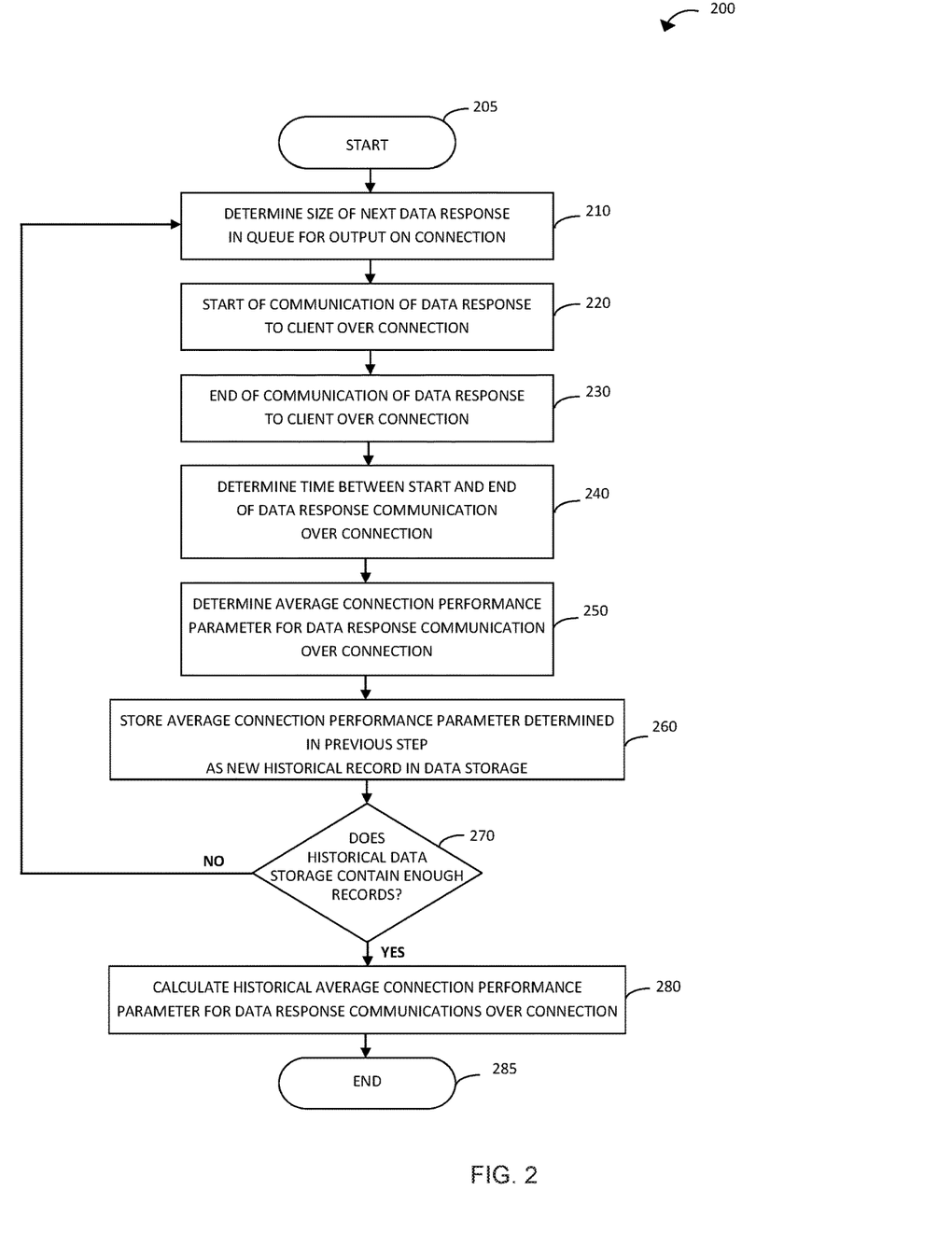
FIG. 2 is a flowchart illustrating a method for monitoring data communications over a connection in accordance with an example implementation of the present disclosure.

FIG. 2 is a flowchart illustrating a method for monitoring data communications over a connection in accordance with an example implementation of the present disclosure. In particular, although not exclusively, the illustrated method may be performed by the connection manager 50 of the server device 20 of FIG. 1. The method may be performed initially, for example upon installation of the connection manager 50, and thereafter at predetermined time intervals and/or in response to events. The method monitors a single connection for data communications. Thus, in the case of multiple connections, the method is performed for each of the connection in turn or concurrently. As discussed in further detail below, the method monitors each connection to obtain data that is of a sufficient sample size to be statistically significant and, thus, representative of the typical or expected operation of the corresponding connection.

Referring to FIG. 2, the method 200 starts at step 205. At step 210, the method determines the size (e.g., in bytes) of the next data response to be communicated over the relevant connection. As discussed above in relation to FIG. 1, the server device 20 queues data responses, for serialized output on a connection 40 (e.g., Connection 1), in output queue 34. The size of the next data response (e.g., in bytes) can be determined from information in the data response packet (i.e., in the case of data communication using network packets) and/or the amount of memory occupied by the data response in the output queue 34 (e.g., in the case of data communication as a bit stream).

At step 220, the method starts the communication of the data response to a client device over the connection and, at step 230, the method ends the communication of the data response to the client over the connection. Details of the processes for starting and ending communication of the data response will depend on the application, such as the type of devices, the type of connection and communication method, such as the communication protocol, used. In example implementations, the method may start the communication at step 220 by initiating conventional handshaking processes with the client device and the method may end the communication at step 230 by receiving an acknowledgement of successful receipt of the data response from the client device. The skilled person will appreciate that many other possibilities exist for defining a start and an end of the communication of the data response.

At step 240, the method determines the duration of time between the start of the data response communication over the connection at step 220 and the end of the data response communication over the connection at step 230. Any suitable technique may be used for determining this time duration for the communication of the data response. For example, the method may start a timer at step 220 and stop the timer at step 230 to determine the time duration. Alternatively, the method may use time stamps in the data associated with the processes at the defined start at step 220 and the defined end at step 230 of the communication, and subtract the end time from the start time to determine the time duration. The skilled person will appreciate that many other possibilities exist for determining the time duration for the communication of the data response, which may be dependent on how the start and end points of the communication are defined.

At step 250, the method determines an average connection performance parameter for the communication of the data response over the connection. In example implementations, step 250 may determine an average data rate for the data response over the connection, for example by dividing the time duration determined at step 240 by the size of the data response determined at step 210. Other, more complex techniques for determining an average data rate, e.g., that take into account the type of data response, are possible and contemplated by the present disclosure. In other example implementations, step 250 may determine another type of average connection performance parameter such as an average time to communicate a single byte of data of the data response over the connection by dividing the size of the data response determined at step 210 by the time duration determined at step 240. In yet further example implementations, any other type of connection performance parameter that is a statistically meaningful representation of the connection performance may be used. At step 260, the method stores the average connection performance parameter for the data response, determined in step 250, as a new historical data record in data storage. The historical data record may include not only the determined average connection performance parameter but may also include any other relevant information such as an identifier for the connection, a start time, end time and/or duration of the data response communication, a size and/or type of data response etc.

At step 270, the method determines whether the data storage contains enough historical data records of data response communications over the connection to be representative of a typical operation of the connection. As the skilled person will appreciate, in order to obtain a statistically meaningful representation of the typical operation of a connection, it is necessary to use a sample of historical data records of a minimum sample size. Thus, it is necessary to monitor the connection over a minimum time period or for a minimum number of data responses or amounts of data so that the sample of historic data records encompasses the various different types of real world behavior of the connection. The minimum sample size for the historical data records will be dependent on the application but can be predetermined by the system designer or user and updated, as necessary, for use as a threshold in step 270. In example implementations, the step 270 may compare the number of historical data records for the connection stored in the data storage with a predetermined threshold number of data records. In other example implementations, step 270 may compare the total time duration of all the historical data records for the connection stored in the historical data storage with a predetermined threshold time. The skilled person will appreciate that many other possibilities exist for performing the determination in step 270.

If step 270 determines that the data storage does not contain enough historical data records of previous data response communications over the connection, for example, the data sample size does not meet the relevant minimum sample size, the method returns to step 210 and performs steps 210 to 270 for the next data response in the queue for output on the connection. The method then continues in a loop, by processing the data responses in the queue using steps 210 to 270, until step 270 determines that the data storage contains enough historical data records to meet the relevant minimum sample size. If or when step 270 determines that the data storage contains enough historical data records of previous data response communications over the connection, the method proceeds to step 280.

At step 280, the method calculates a historical average connection performance parameter for all the data response communications in the historical data records for the connection stored in the data storage. In example implementations, the historical average connection performance parameter may be a historical average data rate for the connection based on the average data rate determined in step 250 for each of the data response communications in the historical data records. The historical average data rate may be a mean average of the average data rates or a median average of the average data rates or may be a mean average derived from the raw data in the historical data records. In example implementations in which a different connection performance parameter is determined in step 250, such as an average time to communicate a single byte of data of the data response over the connection as described above, step 280 may determine an equivalent historical average connection performance parameter. In this case, the historical average connection performance parameter may be calculated as the mean or median average of the connection performance parameters for all the data response communications in the data records for the connection stored in the historical data storage. The skilled person will appreciate that other method for calculating a statistical value representative of the typical performance of the connection as a historical average connection performance parameter are possible and contemplated by the present disclosure.

After calculating the historical average connection performance parameter at step 280 the method ends at step 285. However, it will be appreciated that the method of FIG. 2 may be performed for each connection, either sequentially or concurrently. In addition, the method of FIG. 2 may be repeated at predefined time intervals, or in response to events (such as the addition of a new connection), to determine an updated new historical average connection performance parameter (or its equivalent) for each connection indicative of an up-to-date typical performance of the connection, which may change over time.

As the skilled person will appreciate, the above-described method of FIG. 2 monitors each data response communicated over a connection, determines an average connection performance parameter for the communication of each monitored data response, and stores a corresponding record for each individual data response. However, in example implementations, the method may monitor multiple data responses communicated over a connection as a group, determine an average connection performance parameter for the group of data responses and store a corresponding record for the group of data responses. In this case, step 210 could determine the size of the next group of data responses, step 240 could determine the time between the start and end of communication of the group of data responses and step 250 could determine the average connection performance parameter for communicating the group of data responses, accordingly.

Figure 3:
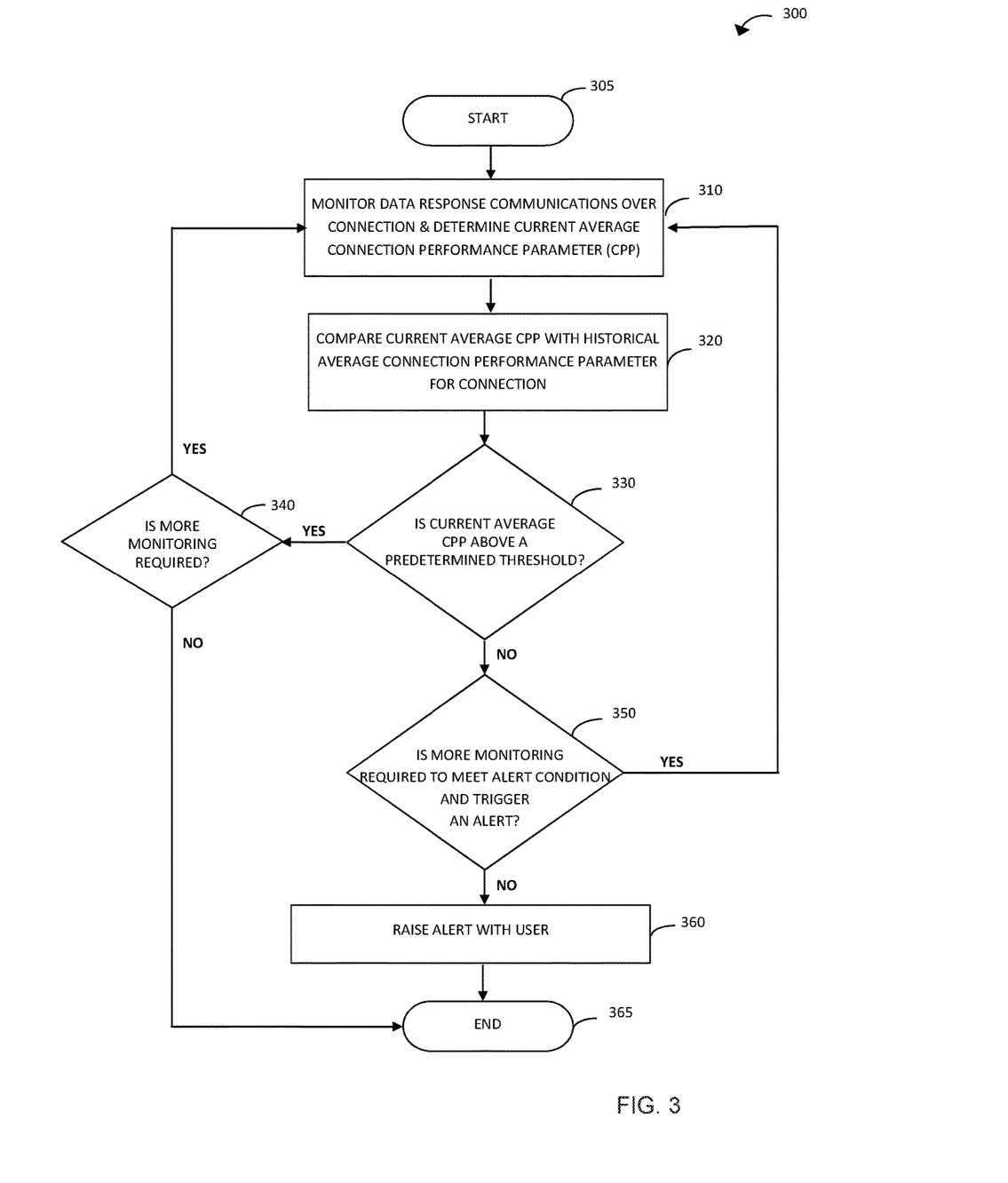
FIG. 3 is a flowchart illustrating of a method for identifying degraded performance of a connection in accordance with an example implementation of the present disclosure.

FIG. 3 is a flowchart illustrating of a method for identifying a degraded connection in accordance with an example implementation of the present disclosure. In particular, although not exclusively, the illustrated method of FIG. 3 may be performed by the connection manager 50 of the server device 20 of FIG. 1. The method may be performed after the method of FIG. 2 so that a historical average connection performance parameter (e.g., historical average data rate) is known for each connection. The method monitors a single connection for data communications. Thus, in the case of multiple connections, the method is performed for each of the connection in turn or concurrently. As discussed in further detail below, the method monitors each connection to determine whether it has become degraded, for example in terms of performance or quality thereof.

Referring to FIG. 3, the method 300 starts at step 305. At step 310, the method monitors communications of data responses over a connection for a predefined time interval, or for a predetermined number of data responses or amount of data, to determine a current average connection performance parameter for the connection. For example, step 310 may use steps 210 to 250 of the method of FIG. 2 to monitor the communication of individual data responses or groups of data responses, and use the data obtained from monitoring to determine the current average connection performance parameter for the connection. In example implementations, the current average connection performance parameter may be a current average data rate, which may be determined in step 310, for example, by determining a mean or median average of the average data rates determined in step 250, for all of the monitored data response communications for the connection. In example implementations in which the method of FIG. 2 determines a different average connection performance parameter, such as an average time to communicate a single byte of data of the data response over the connection as described above, step 310 may determine an equivalent current average connection performance parameter. In this case, the current average connection performance parameter may be calculated as the mean or median average of the connection performance parameters for all of the monitored data response communications for the connection. The skilled person will appreciate that other method for calculating a statistical value representative of the current performance of the connection for use as a current connection performance parameter are possible and contemplated by the present disclosure.

At step 320, the method compares the current average connection performance parameter for the connection with the historical average connection performance parameter for the connection, and at step 330 determines whether the current average connection performance parameter is above a predetermined threshold. The predetermined threshold represents a performance value at or below which the connection is considered to be degraded. In statistical terms, a performance value at or below the predetermined threshold may be regarded as an outlier from the typical performance limits for the connection as represented by the historical data records. In example implementations, the predetermined threshold may be a threshold value based on the historical average connection performance parameter for the connection such as the historical average data rate. For example, the predetermined threshold may be a predetermined function of the historical average connection performance parameter such as the historical average data rate. In example implementations, the predetermined threshold may be a predetermined proportion of the historical average data rate, for example in the range of 5% to 30% of the historical average data rate, such as 10% of the historical average data rate. In other example implementations, the predetermined threshold may be a threshold value set by the system designer or user to represent degraded performance, and the set threshold value may be updated, as necessary, for use in step 330.

If step 330 determines that the current average connection performance parameter for the connection is above the predetermined threshold, then the performance of the connection is considered to be within its usual limits and the method proceeds to step 340. At step 340, the method determines whether further monitoring of communications of data responses is required. For example, further monitoring of the same connection may be required if the current average connection performance parameter determined at step 310 is less than another predetermined threshold that is higher than the predetermined threshold used in step 330, but which may be indicative of a performance value below which the connection is considered to have poor performance and/or has the potential to become degraded. Alternatively, further monitoring of a different connection may be required if the method of FIG. 3 is performed for each of a plurality of connections in sequence. It will be appreciated that the method of FIG. 3 may equally be performed for some or all of the connections concurrently. If step 340 determines that further monitoring of communications of data responses on the same or a different connection is required, the method returns to step 310. Otherwise, the method ends at step 365.

If step 330 determines that the current average connection performance parameter for the connection is less than or equal to the predetermined threshold, then the current performance of the connection is considered to degraded and the method may proceed to optional step 350. At optional step 350, the method determines whether additional monitoring of data response communications for the connection is required for triggering an alert that the connection is degraded. In particular, the triggering of an alert may be dependent on a predetermined alert condition being met. The alert condition may be based on an amount of monitoring to determine the current average connection performance parameter for the connection in step 310, such as the monitoring time, the quantity of data monitored or a number of data response communications monitored. In example implementations, the monitoring in step 310 may be sufficient to meet the alert condition such that step 350 can be omitted or step 350 determines that the alert condition is met. In this case, the method proceeds to step 360 by raising an alert with the user. In other example implementations, the monitoring in step 310 may be insufficient to meet the alert condition. In this case, the method returns to step 310 and performs additional monitoring of the connection to determine an updated current connection performance parameter for the connection. For example, additional monitoring may be performed in repeat step 310 for one or more additional time intervals, or for one or more additional predetermined numbers of data responses or amounts of data, and a cumulative or rolling current average connection performance determined, where the cumulative monitoring (i.e., original and additional monitoring in step 310) meets the alert condition required to trigger an alert. Alternatively, the additional monitoring performed in repeat step 310 may be for a longer time interval, or for a greater predetermined numbers of data responses or greater amount of data than previously, and a new current average performance parameter determined, wherein the additional monitoring in repeat step 310 alone (i.e., exclusive of the original monitoring in step 310) meets the alert condition required to trigger an alert.

As the skilled person will appreciate, optional step 350 may be included to prevent triggering a false alert. In particular, additional monitoring may be desired, for example, if the amount of monitoring performed in original step 310 is relatively small, to prevent a false alert in the case that the connection is degraded temporarily. In such a case, the connection may return to its usual performance during the additional monitoring in repeat step 310. The skilled person will appreciate that the determination in step 350 of whether additional monitoring is required before triggering an alert is dependent upon the application. Typically, the amount of monitoring required to meet an alert condition for triggering an alert is predetermined by the system designer and may be updated by the user. The skilled person will further appreciate that other methods for performing the determination in step 350 are possible and contemplated by the present disclosure.

If step 350 determines that additional monitoring is required before triggering an alert, the method returns to step 310, and thereafter repeats steps 310 to 350 one or more additional times. If during a repeat step 330, the method determines that the updated (e.g., cumulative or new) current average connection performance parameter is above the predetermined threshold, then the performance of the connection is considered to have returned to its usual limits and the triggering of a false alert is prevented. Otherwise, if during all of the one or more repeats of step 330, the method determines that the current average connection performance parameter is less than or equal to the predetermined threshold, the current performance of the connection is considered as remaining degraded. In that case, the method then proceeds to step 360 by raising an alert with the user.

As the skilled person will appreciate, any suitable method for raising an alert with a user may be employed in step 360, including visual, audible and/or tactile alerts. For example, a message may be displayed on a display screen and/or an audible or vibratory alarm may be activated.

Figure 4:
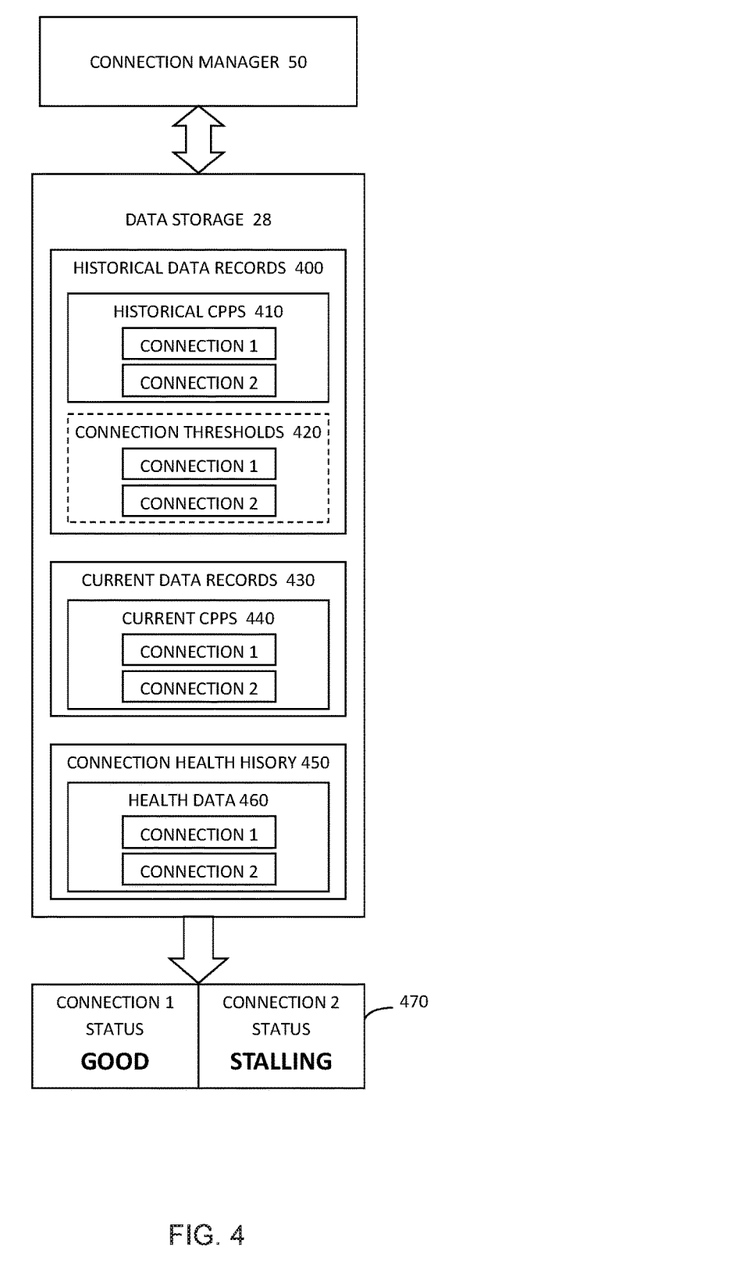
FIG. 4 is a schematic diagram showing data maintained in accordance with an example implementation of the present disclosure.

FIG. 4 is a schematic diagram showing data records in accordance with an example implementation of the present disclosure. For example, although not exclusively, the illustrated data records may be produced and/or maintained by the connection manager 50 of FIG. 1 when implementing the method of FIG. 2 and/or FIG. 3. In particular, the connection manager 50 may store the illustrated data records in the associated data storage 28.

In example implementations, the connection manager 50 monitors communications of data responses from the queue 34 of server device 20 to client devices 30 over the connections 40 to obtain corresponding monitored data (e.g., including data quantity and time interval for the monitored data communications), for example using steps 210-240 of the method of FIG. 2. In addition, the connection manager 50 determines an average connection performance parameter (e.g., average data rate) for the connections 40, for example, using step 250 of the method of FIG. 2. As shown in FIG. 4, the connection manager 50 stores the obtained data as historical data records 400 for each of Connections 1 and 2 in data storage 28, for example using step 260 of the method of FIG. 2. In particular, the historical data records 400 include a historical average connection performance parameter (CPP) (e.g., historical average data rate) 410 for each of Connections 1 and 2. The historical average CPP 410 for each of Connections 1 and 2 may be updated periodically or in response to events, as described above. For example, the historical average CPP may be updated using current monitored data to determine a cumulative or rolling average. In example implementations, the data storage 28 may also include a threshold value 420 for each of Connections 1 and 2, which may be determined by the connection manager 50 or otherwise. For example, the threshold value 420 for Connection 1 may be determined as a function of the historical average CPP 410 for Connection 1 and the threshold value 420 for Connection 2 may be determined as a function of the historical average CPP 410 for Connection 2, as described above.

Further, in example implementations, the connection manager 50 monitors data communications from the queue 34 of server device 20 to client devices 30 over the connections 40 to obtain corresponding data and determine a current average connection performance parameter (e.g., current average data rate), for example using step 310 of the method of FIG. 3. The connection manager 50 stores the obtained data as current data records 430 for each of Connections 1 and 2. In particular, the current data records 430 include a determined current average connection performance parameter (CPP) (e.g., current average data rate) 440 for each of Connections 1 and 2. As the skilled person will appreciate from the above description of the method of FIG. 3, the current average CPP 440 for Connection 1 is compared with the threshold value 420 for Connection 1 to determine whether the performance of Connection 1 is degraded. Similarly, the current average CPP 440 for Connection 2 is compared with the threshold value 420 for Connection 2 to determine whether the performance of Connection 2 is degraded.

Finally, the connection manager 50 may optionally maintain a health history 450 for each of Connections 1 and 2. For example, the health history 450 may comprise connection health data 460 indicating the outcome of each periodic monitoring of the corresponding connection, for example in accordance with steps 330-360 of the method of FIG. 3. The health data 460 may include a time stamp or value associated with the monitoring period. The outcome of the monitoring may include the status "Good", for example if step 330 determines that the current average connection performance parameter is above the predetermined threshold, or the status "Stalling", for example if step 330 determines that the current average connection performance parameter is less than or equal to the predetermined threshold and an alert is triggered in step 360. As the skilled person will appreciate, other intermediate outcomes of the monitoring are possible, for example the status "Warning" may be included in the case that step 330 determines that the current average connection performance parameter is less than or equal to the predetermined threshold (or a higher further threshold) but an alert is not subsequently triggered.

As shown in FIG. 4, the current status of each of Connections 1 and 2 may be provided by the connection manager 50 for display on a graphical user interface (GUI) 470 to the user. In the illustrated example, the GUI 470 indicates that the status of Connection 1 is "Good" but the status of Connection 2 is "Stalling". The GUI 470 may be used to display the alert to the user in accordance with step 360 of FIG. 3, for example by indicating the "Stalling" status of Connection 2 in red or flashing, in combination with any of the abovementioned types of alarm. As discussed above, the "Stalling" status of Connection 2 indicates that the connection is still active but is degraded, e.g., is experiencing a slowdown that may lead to, or has already led to, a backlog of data communications to and from the server device 20 as well as a backlog of processing therein. By detecting such a slowdown, before the server device 20 and/or the system 10 stalls (i.e., stops functioning), the user is alerted an is able to act to address the problem more quickly.

The present disclosure encompasses a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some example implementations, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to example implementations of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various example implementations of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
monitoring a communication of data from a device over a connection;
obtaining a data sample having at least a minimum sample size that is statistically representative of a typical operation of the connection and responsively determine a statistical value as an historical connection performance parameter for the connection;
determining a current connection performance parameter for the connection, based on the monitoring;
comparing the current connection performance parameter with a predetermined threshold, and
determining that the connection is degraded if the current connection performance parameter is less than or equal to the predetermined threshold, wherein a degraded condition indicates that the connection has a reduced average data communication rate and that the connection is still active;
in response to determining that the connection is degraded:
determining whether a predefined alert condition is satisfied;
based on a determination that the predefined alert condition is satisfied, providing the alert to a user, and
based on a determination that the predefined alert condition is not satisfied, performing additional monitoring of the communication of data from the device over the connection to determine an updated current connection performance parameter,
wherein the predetermined threshold is a fixed percentage of the historical connection performance parameter for the connection and wherein the fixed percentage is in a range of five to thirty percent.

2. The method of claim 1, wherein the monitoring comprises at least one of:
monitoring communications of data from the device over the connection for a predefined time interval; and
monitoring communications of data from the device over the connection for a predetermined amount of data.

3. The method of claim 1, wherein the predetermined threshold is based on a predetermined historical connection performance parameter.

4. The method of claim 1, wherein the current connection performance parameter for the connection comprises one of: a current average data rate for the connection, or a current average time to communicate a unit of data over the connection.

5. The method of claim 1, wherein the monitoring comprises recording a data quantity and time interval for the communication of data from the device over the connection.

6. The method of claim 1, further comprising, in response to determining that the connection is degraded, providing an alert to a user indicating that the connection is degraded.

7. The method of claim 1, comprising periodically performing the method for each of a plurality of connections from the device, wherein each of the plurality of connections comprises one of: a communication path over a wired or wireless link, an independent transmission session over a wired or wireless link, or a communication path over a wired or wireless system bus.

8. The method of claim 1, further comprising:
monitoring the communication of data from the device over the connection to obtain a data sample having at least a minimum sample size that is statistically representative of a typical operation of the connection, and
using the data sample to determine a statistical value as an historical connection performance parameter for the connection.

9. The method of claim 8, wherein the method further comprises:
updating the predetermined threshold, wherein updating the predetermined threshold comprises updating the historical connection performance parameter for the connection based on data obtained by the monitoring for determining a current connection performance parameter for the connection.

* * * * *